Patented Sept. 6, 1932

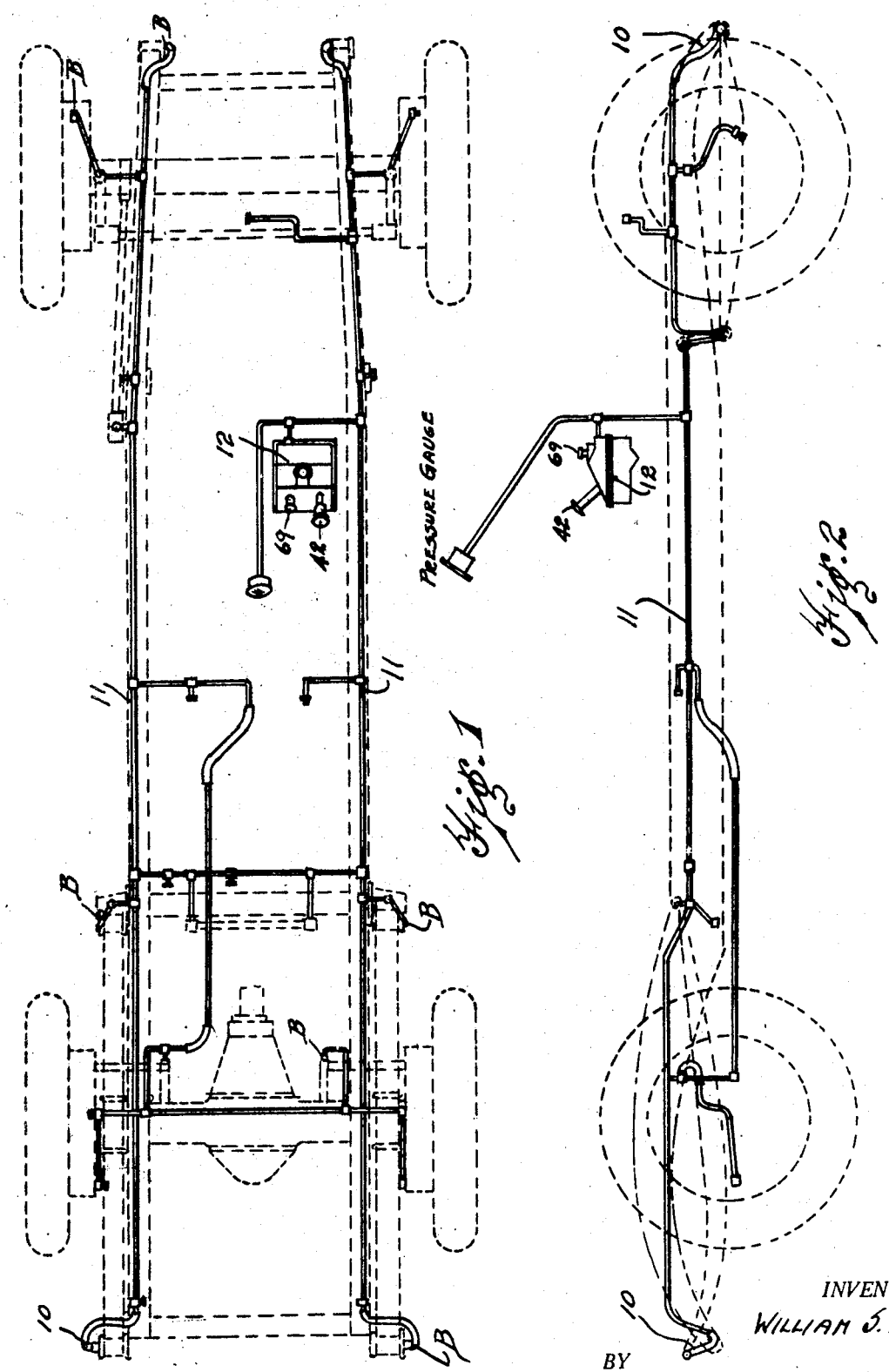

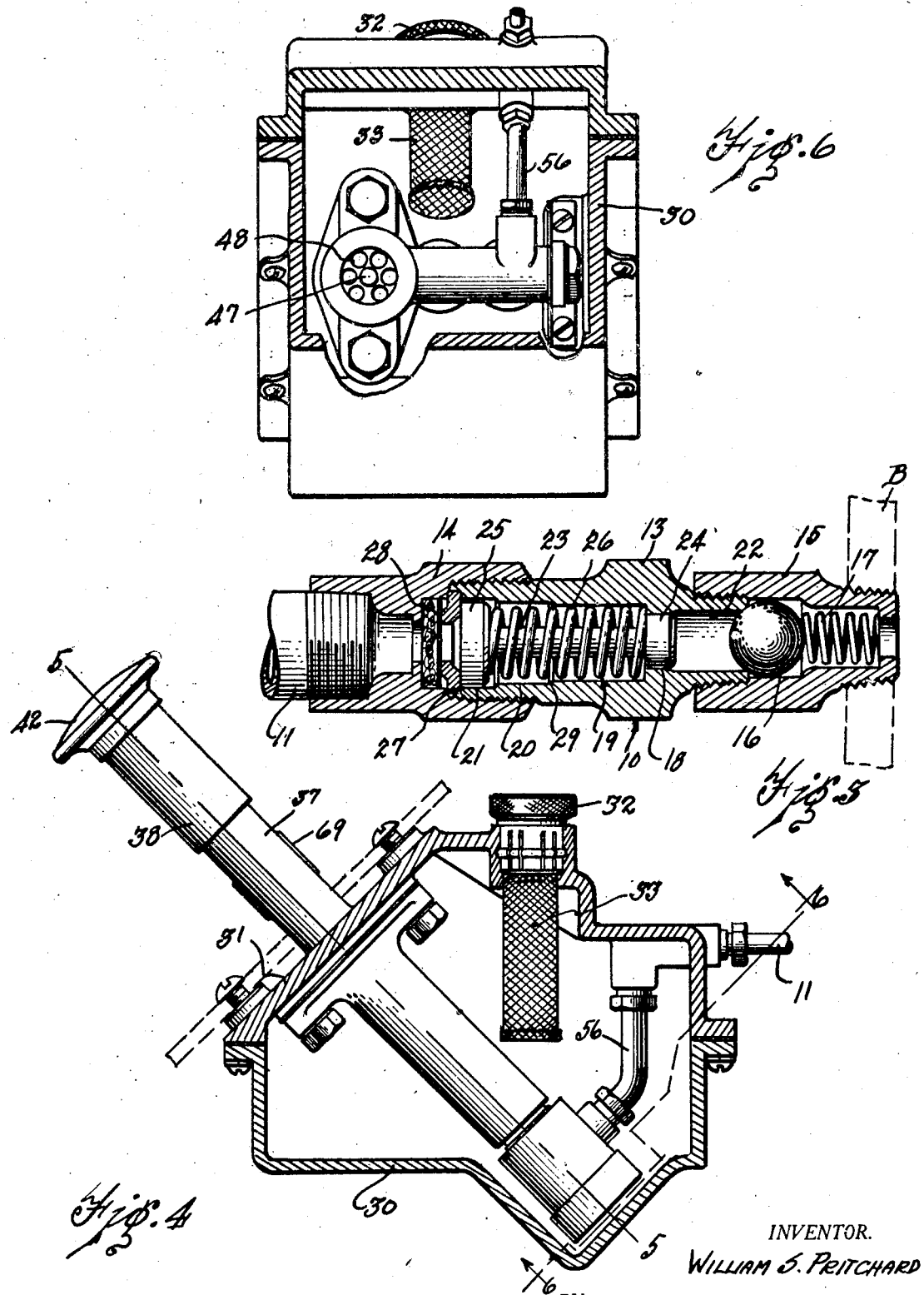

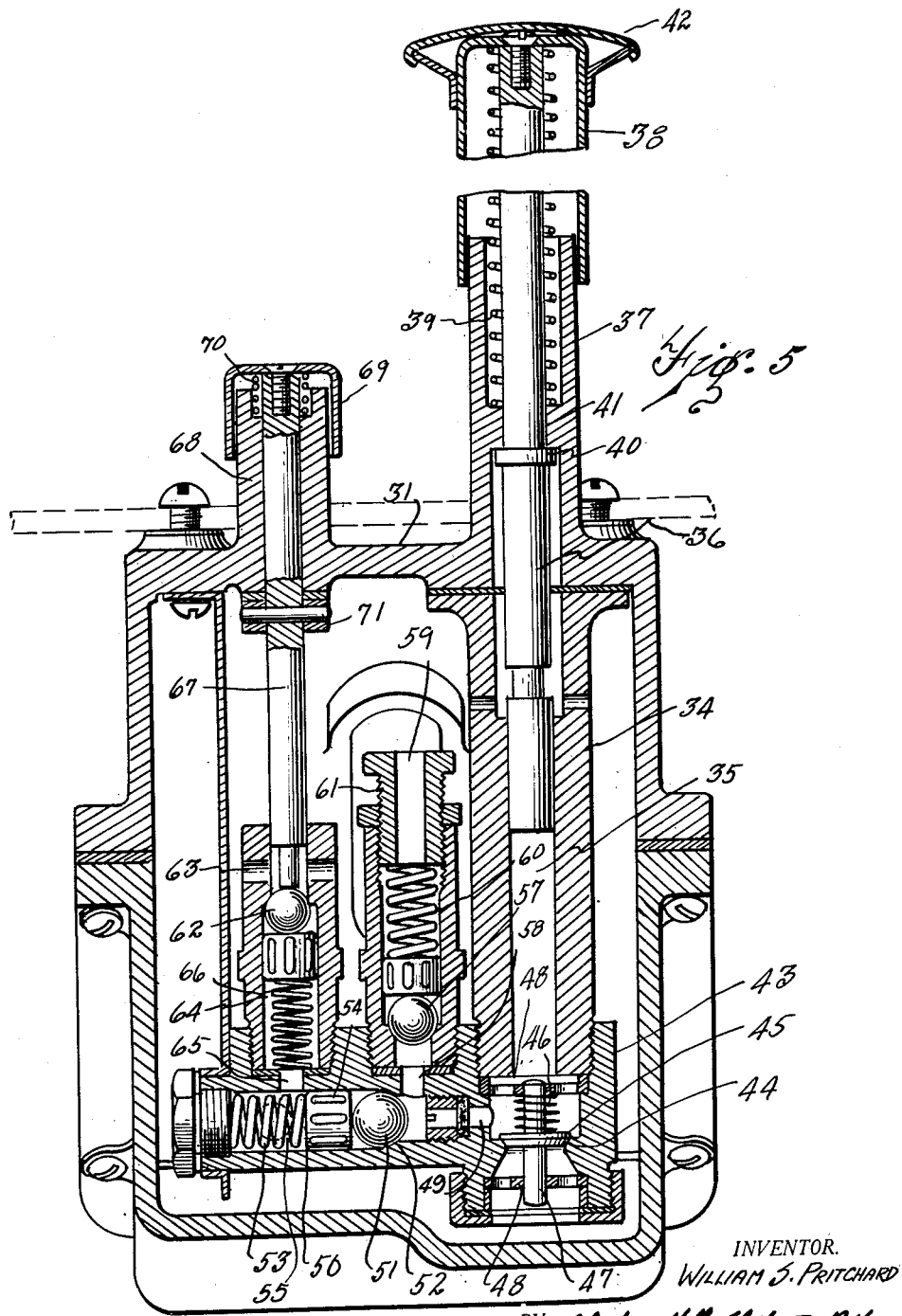

1,876,343

UNITED STATES PATENT OFFICE

WILLIAM S. PRITCHARD, OF DETROIT, MICHIGAN, ASSIGNOR TO MOTOR PRODUCTS CORPORATION, OF DETROIT, MICHIGAN, A CORPORATION OF NEW YORK

LUBRICATING SYSTEM

Application filed September 15, 1926. Serial No. 135,611.

This invention relates to lubricating systems and more particularly to pressure systems of this character for use in connection with motor vehicles and the like for effecting the simultaneous lubrication of a number or all of the bearings or other parts requiring lubricant.

Chassis lubricating systems of this character as now developed involve a source of lubricant supply, a system of conduits extending therefrom to the several points of distribution and a plurality of valves arranged at the points of distribution and operable to control the supply of lubricant passing to the bearings or other parts to be lubricated. It is essential to the success and commercial acceptability of systems of this character that such systems be adequate to consistently conduct and deliver to each of the several points of distribution, a predetermined measured quantity of lubricant. Heretofore difficulty has frequently been experienced because of the inadequacy of the valves which frequently become stuck in open or closed position with the result that the lubricant is permitted to escape after the lubricating operation is completed or the point of distribution controlled by the incapacitated valve fails to receive any supply of lubricant at all. The valves become inoperative from freezing, solidified lubricant which interferes with the operation of the moving parts thereof or from accummulation of foreign matter.

In many of the so-called chassis lubricating systems now in use a number of lubricant delivering valves are connected in series by a single conduit having a plurality of branches, lubricant being successively supplied to the several valves commencing with the one most remote from the source of supply and continuing with those arranged nearer. In systems of this character the failure of one or more of the valves to function for the reasons as previously pointed out results in the failure generally of all of the valves of that series and as a consequence inefficient lubrication.

Among the essential requisites of a consistently efficient commercially acceptable chassis lubricating system are: First, that the structural characteristics of the valve be such as to measurably admit a predetermined supply of lubricant on each lubricating operation irrespective of the amount of pressure upon the lubricant, the length of time the lubricant is maintained under pressure or the resistance in the bearing to be lubricated; second, that the condition of the bearing or other part to be lubricated, as effected by wear or use, will have no effect upon the amount of lubricant supplied by that particular valve; third, that means be provided for creating sufficient pressure upon the lubricant at the source and for maintaining this pressure to insure the complete operation of every valve including those most remote from the source of supply; fourth, that means be provided to relieve the pressure upon the lubricant at the source of supply to permit the several valves to return to their normal position of rest; fifth, that means be provided to prevent more than a predetermined pressure being built up at the source of lubricant supply to thus prevent injury to the conduits or valves; and sixth that the valves include as a part thereof checks functioning in the normal position of the valves, that is when the pressure has been relieved thereon, to close communication between the supply conduit and the part to be lubricated.

With a system involving the above characteristics the source of lubricant supply may be placed under pressure for instance by means of a simple, manually operated pump whereupon the lubricant will be forced through the several conduits to the valves which will permit a predetermined measured amount of lubricant to pass to the part to be lubricated whereupon the valves will seat thus preventing any further delivery of lubricant to that particular bearing. The valves which have already functioned in this manner will be maintained in this position until those valves which are slower in operation have completed the delivering operation. The pressure built up upon this lubricant supply may be sufficient to insure the operation of the most remote or slower operating valves while the creation of an excessive pressure upon the lubricant supply is avoided by providing a by-pass functioning after a predetermined pressure has been attained. When the operator is satisfied that each of the several valves has functioned the pressure upon the lubricant at the source and in the several conduits may be relieved by means of a pressure relief valve which will permit the lubricant in the several conduits to again return to atmospheric pressure whereupon the several valves by reason of spring operated parts thereof will return to their normal positions of rest wherein the check valves function to close communication between the source of supply or conduits and the bearings or other parts to be lubricated.

The herein described system involves the above and many other advantages in operation some of which will appear more fully hereinafter. The operation of this system involves the use of a pump for building up pressure upon the lubricant supply together with an automatically operable by-pass and a pressure relief valve and in the present application one form of pump, which has been found to give particularly satisfactory results in actual practice, is described and illustrated somewhat in detail. In addition the present system contemplates the provision of a plurality of valves designed to normally check communication between the source of lubricant supply and the part to be lubricated and operable by the lubricant pressure to permit a measured supply of lubricant to be delivered to the bearing on each operation and to then again close communication between the source of supply and the part to be lubricated and to remain in this position until pressure upon the lubricant supply has been removed.

One valve of this character which in practice has been found to give entirely satisfactory results is described and illustrated in my co-pending application, Serial #60,583 filed Oct. 5, 1925. Another similar form of valve which will operate with equal efficiency in connection with the present system is illustrated and described in my co-pending application, Serial #80,686, filed Jan. 11, 1926. The lubricant may be delivered to the shackle bolts of the vehicle structure by means of a valve formed as a part of the shackle bolt and a construction of this character which in practice has demonstrated its utility is described and illustrated in my Patent Number 1,657,586, issued January 31, 1928.

However, as will be apparent as this description proceeds the advantages and utility of the present system are not dependent solely upon the particular structural characteristics of either the pump or the measuring valve and as a consequence the invention should not be considered as limited in this respect. The several objects and novel details of construction involved will be made more apparent, especially when considered in connection with the accompanying drawings wherein:

Figure 1 is a semi-diagrammatic plan view of a motor vehicle chassis equipped with my improved lubricating system.

Figure 2 is a side elevation of the structure illustrated in Figure 1.

Figure 3 is an enlarged longitudinal sectional view through one of the measuring valves.

Figure 4 is a vertical sectional view through the pump.

Figure 5 is a sectional view taken substantially on the plane indicated by line 5—5 in Figure 4, and Figure 6 is a sectional view taken substantially on the plane indicated by line 6—6 in Figure 4.

Referring now particularly to Figures 1 and 2 it will be noted that there is illustrated a conventional form of motor vehicle chassis showing the arrangement or disposition of the several bearings or points of distribution of the lubricant, at each of which points a measuring valve 10 is provided connected at one end to the part to be lubricated and at the other to a supply conduit 11. Obviously the number as well as the location of the bearings or points of distribution will vary in accordance with the design of the vehicle chassis.

The reference character 12 indicates generally a pump by means of which a lubricant is placed under pressure, this pump being connected, by the conduits 11 to the several valves 10 as illustrated clearly in Figures 1 and 2. Obviously while the pump 12 is illustrated herein as supported beneath the floor board of the vehicle it may just as conveniently be located elsewhere upon the vehicle chassis or in fact may be separate from the chassis and only connected thereto when it is desired to furnish a supply of lubricant to the system of conduits and valves arranged on the chassis.

By reference to Figure 3 the operation of one form of valve which functions entirely satisfactorily in connection with this system will be described. This valve is substantially the same as the one described and illustrated in detail in my co-pending application Serial Number 60,583 aforementioned.

The reference character 13 indicates the body of the valve which is exteriorly threaded at one end to receive a sleeve-like extension 14 by means of which the valve is connected to a supply conduit 11. The other end of the valve body is exteriorly threaded for connection with a sleeve-like extension 15 which in turn is connected to the part to be lubricated indicated generally by the reference character B. Communication between the valve proper and the part to be lubricated is normally closed by means of a check valve 16 held seated by means of a spring 17. The valve body 13 is formed beginning at its outlet end with a cylindrical valve surface 18, a cylindrical chambered portion 19 of greater diameter which constitutes a spring chamber, a cylindrical chamber 20 of a still larger diameter which constitutes a measuring chamber and adjacent its inlet end with a cylindrical chamber 21 of still larger diameter constituting a clearance chamber. The valve body immediately adjacent the outlet end is formed with a chamber 22 of a larger diameter than the valve surface or chamber 18 for a purpose to appear more fully hereinafter.

A valve member 23 is reciprocably mounted within the valve body and includes a valve piston 24 and a larger valve piston 25, the former cooperating with the cylindrical valve surface 18 and the latter with the cylindrical valve surface 20 which constitutes the measuring chamber. These valve pistons are rigidly connected by a stem and the entire valve is held in the position illustrated in the drawings by means of a spring 26 in which position the valve piston 25 seats upon a washer 27 and constitutes an inlet check valve. In practice the valve will be provided with a screen 28 to prevent the entrance of foreign matter into the interior of the valve. In the normal position the valve piston 25 is co-incident with the clearance chamber 21 while the valve piston 24 is in coincidence with the cylindrical valve surface 18 wherewith communication through the valve is checked at the inlet and closed at the outlet ends thereof.

The valve member 23 is forced to the right, as viewed in Figure 3, when lubricant under pressure is introduced at the inlet end thereof. During this movement of the valve the lubricant already contained in the chamber defined between the two pistons, or at least a portion of this lubricant, will be forced past the valve piston 24 and check valve 16 and into the part to be lubricated. It will be noted however that the arrangement of the valve pistons 24 and 25 is such that the valve piston 25 engages the cylindrical valve surface 20 prior to the time that the valve piston 24 leaves the valve surface 18 to enter the chamber 22 so that there is never a direct passage through the valve for the lubricant. As the valve piston 25 enters the cylindrical chamber 20 passage of the lubricant through the valve is intercepted and the entire force of the lubricant under pressure is transferred to the left-hand end of this piston whereupon the valve member is forced to the right with an impelling force, this movement being intercepted when the valve piston engages the circumferential seat 29 defining the end of the valve movement. The displacement caused by the piston 25 during its travel along the cylindrical valve surface 20 governs the amount of lubricant forcibly ejected on each operation and as a consequence the capacity of the valve may be governed by forming the seat 29 nearer to or farther from the inlet end of the valve. The escape of the lubricant past the valve piston 24 is permitted when this piston enters the larger chamber 22 which thus provides a clearance space around the piston 24. Obviously when the pressure is relieved upon the source of lubricant contained in the conduits 10 spring 26 will return the valve to its normal position of rest illustrated in Figure 3 wherein both the inlet and outlet ends of the valve are closed. However, as long as the lubricant is maintained under pressure the valve member will be maintained in its extreme right hand position with the piston 25 seated upon the seat 29 whereupon further passage of lubricant through the valve is checked by this piston.

Referring now more particularly to Figures 4, 5 and 6 the novel features of the pump employed will be described. This pump includes a casing or housing 30 provided with a removable cover 31, the container thus produced constituting a reservoir for the supply of lubricant. The lubricant may be introduced into the reservoir by means of an opening closed by cover or cap 32, a screen 33 being preferably provided for preventing the entrance of foreign matter into the reservoir.

Arranged within the reservoir is a member 34 provided with a cylindrical bore or chamber 35 within which a plunger 36 is reciprocably mounted, this plunger extending upwardly through the cover 31 and through a tubular boss or extension 37 on the cover 31. The upper end of the plunger 36 is provided with a sleeve cap 38 which telescopes the tubular boss 37, a spring 39 being provided which normally maintains the plunger 36 in its uppermost position. The upward movement of the plunger is limited by means of a pin or collar 40 engaging a stop 41 on the boss 37. A pedal 42 may be secured to the sleeve cap 38 whereby the plunger may conveniently be operated by the foot.

The lower end of the cylindrical member 34 is open and this member is connected to a valve housing 43. The housing 43 is formed with a circumferential valve seat 44 upon which a valve 45 normally seats under the influence of a spring 46 which surrounds the valve stem 47 of the valve 45. The stem 47 extends from both sides of the valve and is guidingly supported by spaced spiders 48. Upon the upward movement of the plunger 36 the valve 45 is unseated by the suction thus created so as to draw a quantity of lubricant into the cylinder 35. Upon the downward movement of the plunger 36 the valve 45 will seat whereupon the lubricant will be forced laterally through port 49 into chamber 50 of the member 43. In entering this chamber the lubricant is forced past a check valve 51 held normally seated against a valve seat 52 by means of a spring 53 acting on a slidable spider 54. The reference character 55 indicates the outlet opening of the chamber 50 which is connected by means of a conduit 56 (see Figures 4 and 6) to the main supply conduit 11 extending from the pump to the points of distribution. Thus it will be seen that upon a reciprocation of the plunger 36 lubricant under pressure will be forced into the conduits 11.

A normally seated check valve 57 closes communication between port 58 communicating with chamber 50 and port 59 communicating with the interior of the reservoir. This check valve is held seated by means of a spring 60, the tension of which may be adjusted by means of adjusting nut 61. The tension of the spring will be so adjusted that the check valve 57 will be unseated when for instance a predetermined pressure of four hundred fifty pounds (450 lbs.) has been obtained. Thereafter the continued reciprocation of the plunger 36 will force the lubricant through port 58 past check valve 57 and out through port 59 into the reservoir again, this part of the device thereupon functioning as a by-pass. It will be understood that under such circumstances check valve 51 will be held seated by the combined effort of the spring 53 and the pressure of the lubricant in the system.

When the operator has satisfied himself that all of the valves have functioned, the pressure of the lubricant in the system may be relieved by means of the pressure relief valve 62 which normally closes communication between the outlet ports 63 connected through chamber 64 and port 65 with the chamber 50. A spring 66 normally holds the check valve 62 in the closed position illustrated, it being obvious however that the pressure of the lubricant in the system will also tend to seat this valve during the pressure period during which the measuring valves are functioning. The check valve 62 is unseated by means of a plunger 67 which projects upwardly through a tubular boss 68 formed on the cover 31, the end of this plunger being provided with a sleeve cap 69 which telescopes the boss 68, a spring 70 being provided for normally holding the plunger 67 in its upper position wherein the stop collar 71 engages the underside of the cover plate 31. Obviously by depressing the plunger 67 the relief valve 62 will be opened to permit the lubricant under pressure in the conduits 11 to flow back through conduit 56, port 55, chamber 50, port 65, chamber 64 and out through ports 63 into the reservoir.

In practice the operator may reciprocate the plunger 36 a number of times without any particular concern about the amount of pressure being built up in the system because the creation of an excessive pressure is adequately guarded against by the provision of the automatically functioning by-pass. As the maximum desired pressure is quickly attained the conduits and valves of the system will after several reciprocations of the plunger be subjected to the maximum pressure with the result that all of the valves including the most remote or slower operating valves function. Thereafter the reciprocation of the plunger is without any effect upon the system as the valves, after each has functioned, is held in the position wherein the piston 25 is seated upon the valve seat 29 and wherein the further passage of lubricant into the valve is prevented.

Thereafter the operator, by depressing plunger 67, unseats relief valve 62 whereupon the lubricant under pressure in the several conduits flows back through conduit 56 and port 55 into chamber 50 from whence it will pass through port 65, chamber 64 and out through port 63 into the reservoir. Thus the lubricant throughout the system is restored to normal atmospheric pressure and the several valves are permitted, by reason of the springs 26 to return to their normal position of rest wherein both the inlet and outlet ends of the valve are closed. After the pressure in the system has been reduced to normal plunger 67 is released and is returned to its normal position by spring 70 whereupon relief valve 62 is again seated by its spring 66.

In this condition none of the parts are under pressure so that liability of leakage throughout the system is eliminated or at least minimized. Obviously, neither the particular form of valve illustrated herein nor the particular form of pump is essential to the success of the present system although when valves and a pump of this character are employed the system functions entirely satisfactory in practice. In general however it is essential that means be provided for creating and maintaining a pressure upon the lubricant in the system and that means be provided for relieving this pressure. It is also important that an automatically operable by-pass valve or some other similar arrangement be provided to prevent liability of too great a pressure being built up in the system.

As a consequence reservation is made to make such changes, rearrangements and modifications in the details of the apparatus herein illustrated and described as may be found necessary or expedient and as may come within the purview of the accompanying claims.

What I claim as my invention is:
1. In a pressure lubricating system for vehicles, the combination with a lubricant source, a system of conduits, and valves at the points of distribution operable by pressure to deliver lubricant at said points and further operable upon the relief of said pres- sure to return to normal closed position, of means for forcing and maintaining lubricant under pressure in said conduits, a pressure controlled by-pass valve associated with said pump for controlling the pressure built up by said pump and a manually controlled pressure relief valve, means for releasing said lubricant and returning it to said reservoir.

2. In a chassis lubricating system, a lubricant reservoir, a conduit connecting said reservoir to the part or parts to be lubricated, lubricant measuring valves at said parts operable by pressure from normal closed position to deliver a quantity of lubricant and to then close, a pressure pump for forcing lubricant under pressure into the conduit, an automatic by-pass operable when a predetermined pressure has been obtained in said system, and a manually operable pressure relief valve for relieving said pressure.

3. In a pressure lubricating system, a lubricant reservoir, a delivery conduit communicating with said reservoir and with the points of distribution, pressure operated valves at said points for controlling the flow of lubricant thereto, a pump within said reservoir, a check valve between said pump and conduit whereby lubricant under pressure may be delivered to said conduit, a by-pass valve between said check valve and pump and operable upon a predetermined pressure to return the lubricant from said pump back into said reservoir and a manually controlled relief valve connected to said conduit and operable to permit the lubricant therein under pressure to return into said reservoir.

4. In a lubricating system, a lubricant reservoir, a pump within said reservoir, a delivery conduit extending to the points of distribution, pressure operated valves controlling the flow of lubricant to the points of distribution, a valve controlled chamber establishing communication between said pump and conduit, a valve controlled by-pass communicating with the chamber and reservoir and operable when a predetermined pressure is reached to by-pass the lubricant delivered by the pump into the reservoir, and a pressure relief valve also arranged in communication with the said chamber and reservoir and operable to permit the lubricant under pressure in the said conduit to flow back into said reservoir.

5. In a lubricating system, a lubricant reservoir, a delivery conduit communicating with the reservoir and extending therefrom to the points of distribution, pressure operated valves at the points of distribution for controlling the flow of lubricant thereto, a pump for forcing lubricant into the delivery conduit, a manually controlled relief valve establishing communication between the conduit and reservoir and operable to conduct the lubricant under pressure in the delivery conduit back to the reservoir, and a by-pass valve between the relief valve and pump operable upon a predetermined pressure to return lubricant from said pump back into the reservoir.

6. In a lubricating system, a reservoir containing a lubricant, a delivery conduit communicating with the reservoir and extending therefrom to the points of distribution, pressure operated valves at the points of distribution for controlling the flow of lubricant thereto, a manually operable plunger pump arranged within the reservoir for forcing lubricant into the delivery conduit, a manually controlled pressure relief valve located within the reservoir between the pump and conduit and operable to permit the fluid under pressure in the conduit to flow back into the reservoir, and a by-pass valve between the pump and relief valve automatically operable upon a predetermined pressure to return the lubricant from the pump back into the reservoir.

7. In a chassis lubricating system, a lubricant reservoir, a conduit establishing communication between the reservoir and a part to be lubricated, a valve at the part aforesaid operable by pressure from normal closed position to deliver a quantity of lubricant and to then close, a pressure pump located within the reservoir for forcing lubricant under pressure into said conduit, a relief valve also located within the reservoir and operable to relieve the pressure in the conduit when the valve aforesaid is closed, and a pressure operated by-pass establishing communication between the delivery end of the pump and reservoir for controlling the pressure built up by said pump.

In testimony whereof I affix my signature.

WILLIAM S. PRITCHARD.